US012663697B2

(12) United States Patent
Lohmeier

(10) Patent No.: US 12,663,697 B2
(45) Date of Patent: Jun. 23, 2026

(54) METHOD FOR DIGITAL PRINTING ON A RUNNING PRINTING-MATERIAL WEB

(71) Applicant: BST GmbH, Bielefeld (DE)

(72) Inventor: Christian Lohmeier, Bielefeld (DE)

(73) Assignee: BST GmbH, Bielefeld (DE)

( * ) Notice: Subject to any disclaimer, the term of this patent is extended or adjusted under 35 U.S.C. 154(b) by 262 days.

(21) Appl. No.: 18/562,920

(22) PCT Filed: Apr. 28, 2022

(86) PCT No.: PCT/EP2022/061349
§ 371 (c)(1),
(2) Date: Nov. 21, 2023

(87) PCT Pub. No.: WO2022/258255
PCT Pub. Date: Dec. 15, 2022

(65) Prior Publication Data
US 2024/0231191 A1      Jul. 11, 2024

(30) Foreign Application Priority Data

Jun. 11, 2021    (EP) ..................................... 21178985

(51) Int. Cl.
*G03B 15/16*        (2021.01)
*B41F 13/02*        (2006.01)
*B41F 33/00*        (2006.01)

(52) U.S. Cl.
CPC ............ *G03B 15/16* (2013.01); *B41F 13/025* (2013.01); *B41F 33/0036* (2013.01)

(58) Field of Classification Search
CPC .... G03B 15/16; B41F 13/025; B41F 33/0036; B41J 2203/01; B41J 15/04
See application file for complete search history.

(56) References Cited

U.S. PATENT DOCUMENTS

2007/0286472 A1     12/2007   Reunanen et al.
2012/0194791 A1*     8/2012   Duss ...................... B26D 1/405
                                                                     355/53

FOREIGN PATENT DOCUMENTS

EP          1579994 A1      9/2005
EP          2407309 A2      1/2012
EP          2727481 A2      5/2014
EP          4029818 A1      7/2022

* cited by examiner

*Primary Examiner* — Michael E Teitelbaum
(74) *Attorney, Agent, or Firm* — Richard M. Goldberg

(57) ABSTRACT

A method for digital printing on a running printing material web (10), wherein repeating motifs (a, b, c) are continually printed on the web and images of the printed motifs are continually recorded with a camera and rendered as still images (a, b, g) on a display (14) for web observation, with the motifs displayed next to one another in a plurality of tracks (A, B, C) and with a repeat that changes from track to track, and in that the images for web observation are recorded track by track and synchronously with the repeat applicable to the respective track.

7 Claims, 3 Drawing Sheets

METHOD FOR DIGITAL PRINTING ON A RUNNING PRINTING-MATERIAL WEB

BACKGROUND OF THE INVENTION

The invention relates to a method for digital printing on a running printing material web, wherein repeating motifs are continually printed on the web and images of the printed motifs are continually recorded with a camera and rendered as still images on a display for web observation.

Digital printing processes basically only differ from analogue printing processes carried out on rotary printing machines in that a digital printing unit, for example an inkjet printer, is used instead of a rotating printing cylinder to print the motifs. In both cases, web observation allows the quality of the printed images to be monitored during the printing process, so that any errors that may occur can be detected early and can then either be corrected immediately or lead to the printing process being aborted, so that the production large amounts of waste is avoided.

The web observation camera is synchronized with the repeat of the printed motifs in such a way that a still image, which however reflects the appearance of the currently printed motifs, is shown on the display based on the stroboscope principle.

SUMMARY OF THE INVENTION

The object of the invention is to provide a digital printing process with web observation that enables greater flexibility with regard to the organization of the printing process.

This object is achieved according to the invention in that the motifs are displayed next to one another in a plurality of tracks and with a repeat that changes from track to track, and in that the images for web observation are recorded track by track and synchronously with the repeat applicable to the respective track.

The process allows the printed motifs to be arranged on the web in such a way that the area is largely completely filled, thus minimizing the consumption of web material. By synchronizing the camera or several cameras for web observation with the repeat track by track, still images of the subjects in each track can be achieved.

Advantageous refinements and further developments of the invention are specified in the subclaims.

In one embodiment, a separate camera, for example a matrix camera, can be provided for each of the several tracks, the cameras being synchronized with the repeat in the respective track. In this case, the motifs from several or all tracks can be rendered simultaneously on a display as still images.

However, the method can also be carried out in systems in which there is only a single camera for web observation, which can be moved traversingly across the width of the web. In this case, the different tracks on the web can be observed one after the other.

When the camera changes from one track to another, the synchronization is adjusted to the changed repeat.

In addition to web observation systems, so-called inspection systems are also known with which the quality of the printed product can be checked after the printing process has been completed. To do this, the printed web is scanned across its entire width, for example with a line scan camera. An integrated web observation and inspection system is known from EP 2 407 309 B1.

European patent application 21 151 278.5 proposes an inspection system in which the image data from the line camera are recorded during production and stored in the form of a compressed video protocol. If such an inspection system is available, the image data for web observation can also be derived from the data stream supplied by the line camera with a time cycle that can be set for each track.

The subject of the invention is also a web observation system with which the method proposed here can be carried out on a digital printing press.

BRIEF DESCRIPTION OF THE DRAWINGS

Exemplary embodiments of the invention are explained in more detail below with reference to the drawing, wherein.

DETAILED DESCRIPTION

Figure 1:
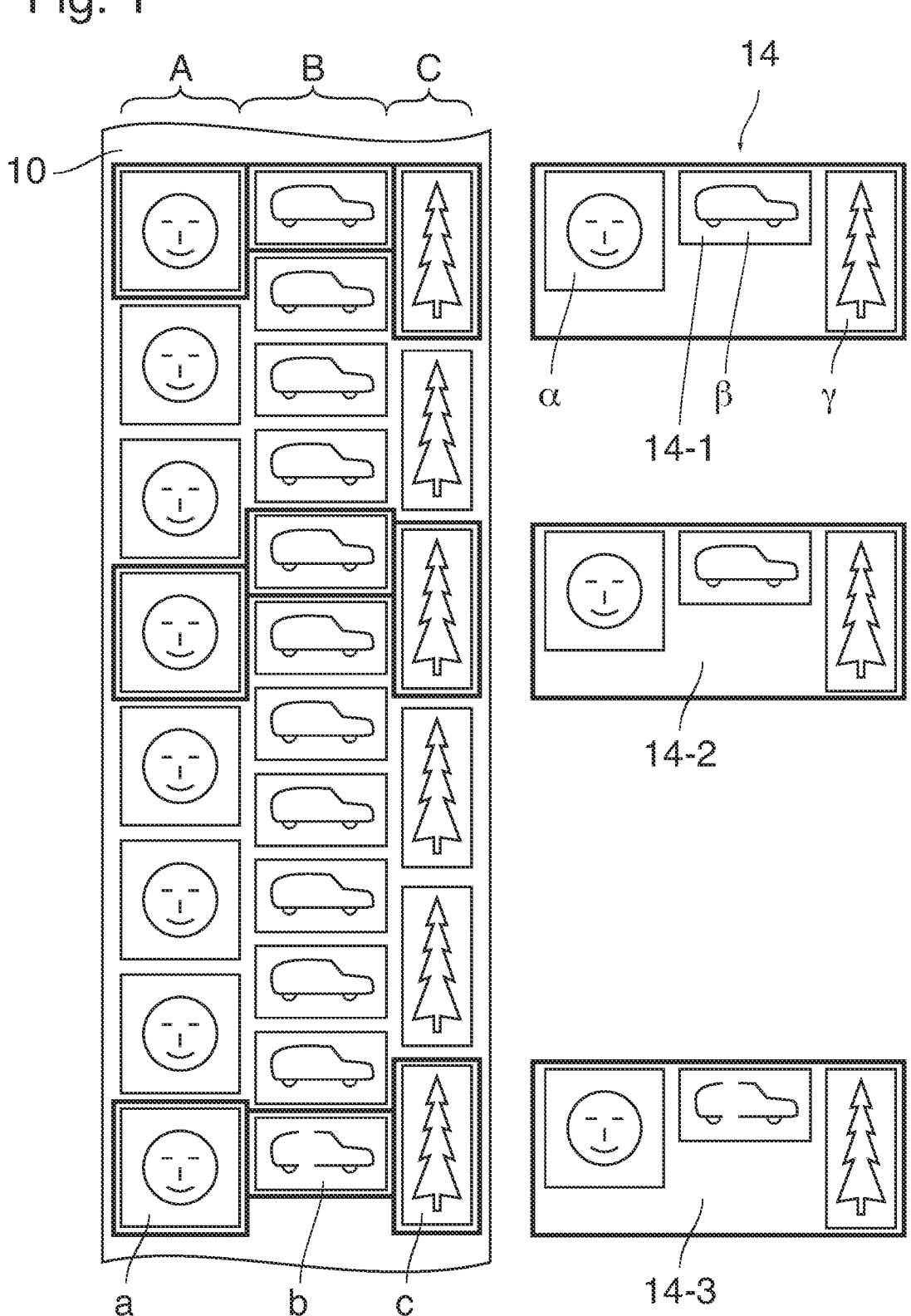
FIG. 1 shows a schematic representation of a section of a printed material web together with images that are reproduced on a display for web observation.

FIG. 1 schematically shows a section of a printing material web 10 which was printed in a digital printing machine 12 (FIG. 2) in three parallel tracks A, B, C with motifs a, b, c. Also shown are display contents 14-1, 14-2 and 14-3 of a display 14 at three different times. At any time, the display shows 14 standing images α, β, γ of the three motifs a, b, c, which were printed on the printing material web 10 at approximately the same time and therefore at approximately the same height.

Figure 2:
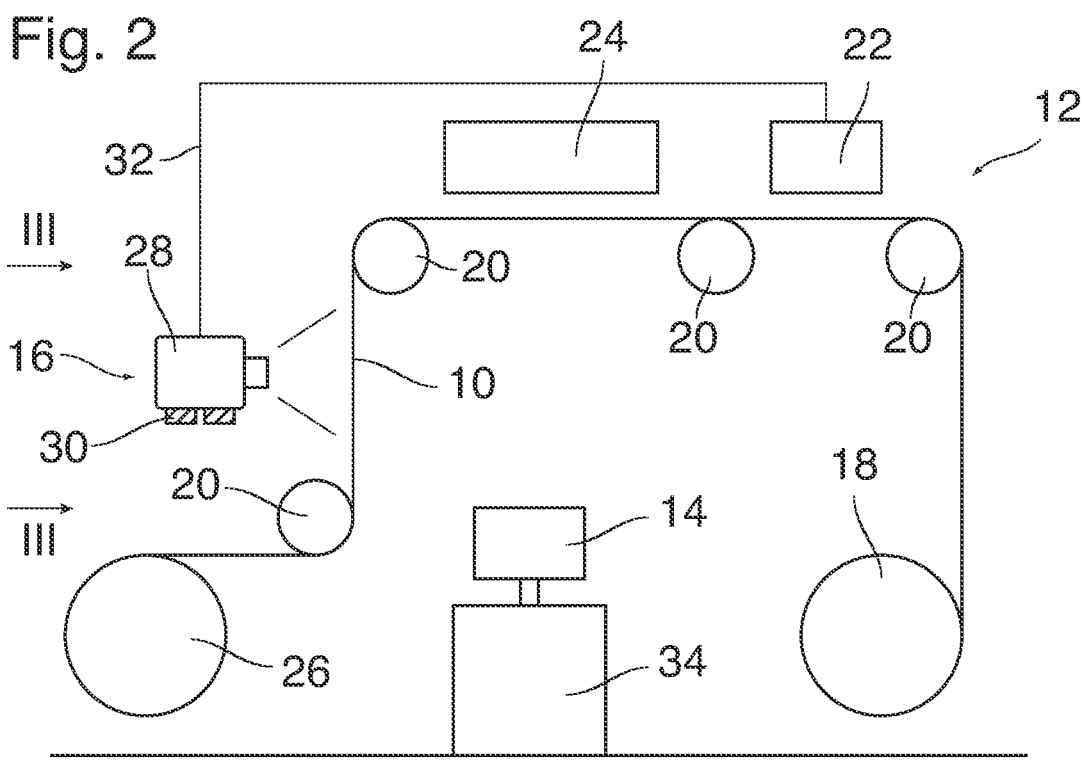
FIG. 2 is a schematic sketch of a digital printing machine with a web observation system.

In FIG. 2, the digital printing press 12 and an associated web observation system 16 are shown in a very simplified manner. The printing material web 10 is pulled off a roll 18, guided past a digital printing unit 22 and a drying station 24 via guide rollers 20 and finally wound up into a roll 26. In the digital printing unit 22, an inkjet printing unit for example, the motifs a, b, c are printed onto the printing material web. The printed images are then dried in the drying station 24.

In this example, the web observation system 16 comprises a camera system with three matrix cameras 28, one for each of the tracks A, B, C, which are arranged along a vertically extending portion of the printing material web 10 and can be moved on rails 30 in the direction transverse to the web. The matrix cameras 28 are each connected to the printing unit 22 via a synchronization line 32 and receive a synchronization signal from the printing unit every time the printing of a motif begins in the track belonging to the camera. After an adjustable delay time, a flash of light is triggered in the associated matrix camera and an image of a portion of the printing material web 10 is recorded, which includes a complete motif a, b or c. The resulting still images α, β, γ are then reproduced on the display 14 in a control center 34 of the printing press.

Figure 3:
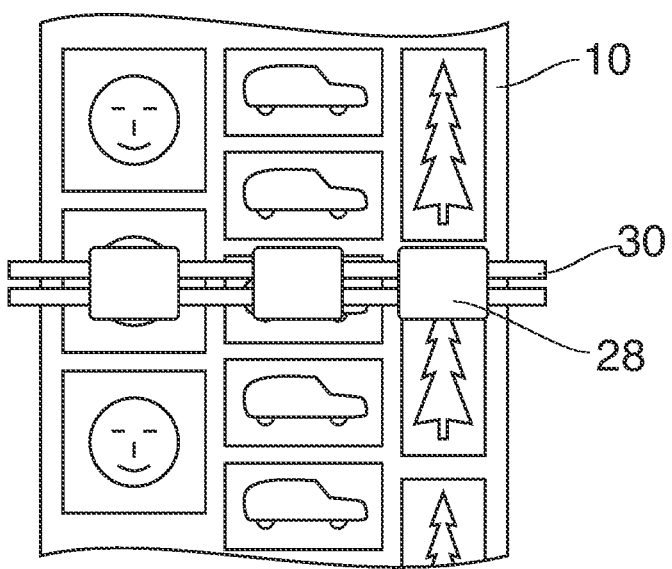
FIG. 3 is a view of parts of the printing press as seen from the direction indicated by arrows III-III in FIG. 2.

FIG. 3 shows a portion of the printing material web 10 facing the web observation system 16 and shows the arrangement of the matrix cameras 28 on the rails 30. The width of tracks A, B, C can vary depending on the print job, and the positions of the cameras 28 on the rails 30 are adjusted such that each camera is centered on the center of the associated track.

As can be seen most clearly in FIG. 1, the motifs a, b, c have different dimensions both in the width direction of the printing material web 10 and in its longitudinal direction, and in each track the motifs are applied to the printing material with a repeat that is adapted to the dimensions of the respective motif in the longitudinal direction of the web. This ensures that the motifs almost completely fill the surface area of the printing material web 10, so that the consumption of printing material is minimized.

In practice, for example when printing packaging material, it will often be the case that the same number of prints of each of the different motifs is required. In the example shown here, this would mean that track B would remain empty towards the end of the print run because the required number of motifs b has already been reached. With the digital printing unit 22, however, it is possible to change the division of the tracks and the arrangement of the motifs during the ongoing printing process, so that the free middle track can then be used to print the required copies of the motif c, whereby not only the material consumption, but also the duration of the print run is minimized.

However, the repeat varying from track to track has the consequence that the relative positions of the motifs printed on the printing material vary. In FIG. 1, for each of the three display contents 14-1, 14-2 and 14-3, those motifs that were recorded by the matrix cameras 28 at the relevant time are outlined in bold. It can be seen that the arrangement of the motifs relative to each other is not stable over time. However, since the matrix cameras 28 are synchronized track by track with the repeat applicable to the respective track, these position deviations are compensated for when the still images α, β and γ are reproduced, so that these images always appear on the screen in the same relative position, so that the images of all three motifs "stand" and none of these images scrolls through on the screen. This makes it possible to assess the quality of all three motifs in real time and identify any errors immediately. In the example shown, it can be seen in the display content 14-3 that some nozzles of the inkjet printing unit have failed in track B and therefore the motif b is not printed completely. In such a case, if the error cannot be corrected immediately, the printing process would have to be aborted.

However, the track-by-track synchronization of the line cameras 28 means that the still images α, β, γ are updated with different image repetition rates. If the repetition rate becomes too high in case of very short motifs and very high printing speeds, it is possible, for example, to halve the repetition rate by only recording every second motif in the relevant track.

It is not mandatory that each of the three motifs is fully observed at all times. If the matrix cameras have a zoom function, it is possible, for example, to zoom in more closely on a subject in order to observe particularly critical areas of the subject more closely. The zoom setting of each matrix camera can be varied from the control center 34 during ongoing production. It is also possible to vary for each camera the delay time between the synchronization signal received via the synchronization line 32 and the time at which the next image is taken. This allows the vertical position of the still image on the display 14 to be adjusted as required, so that, for example, when the image is greatly enlarged, the image section that one would like to examine in more detail is shown on the display 14.

If the matrix cameras 28 each have their own drive with which the position on the rails 30 can be adjusted, the lateral position of the camera can also be changed during operation, so that, in case of an image with large zoom, the image section shown on the display can move in the width direction.

If it is not necessary to constantly monitor all motifs, the method described here can also be carried out with just a single traversable camera, which is then set to different tracks at different times, wherein, in the event of a track change, the synchronization signal is automatically switched in accordance with the new.

Figure 4:
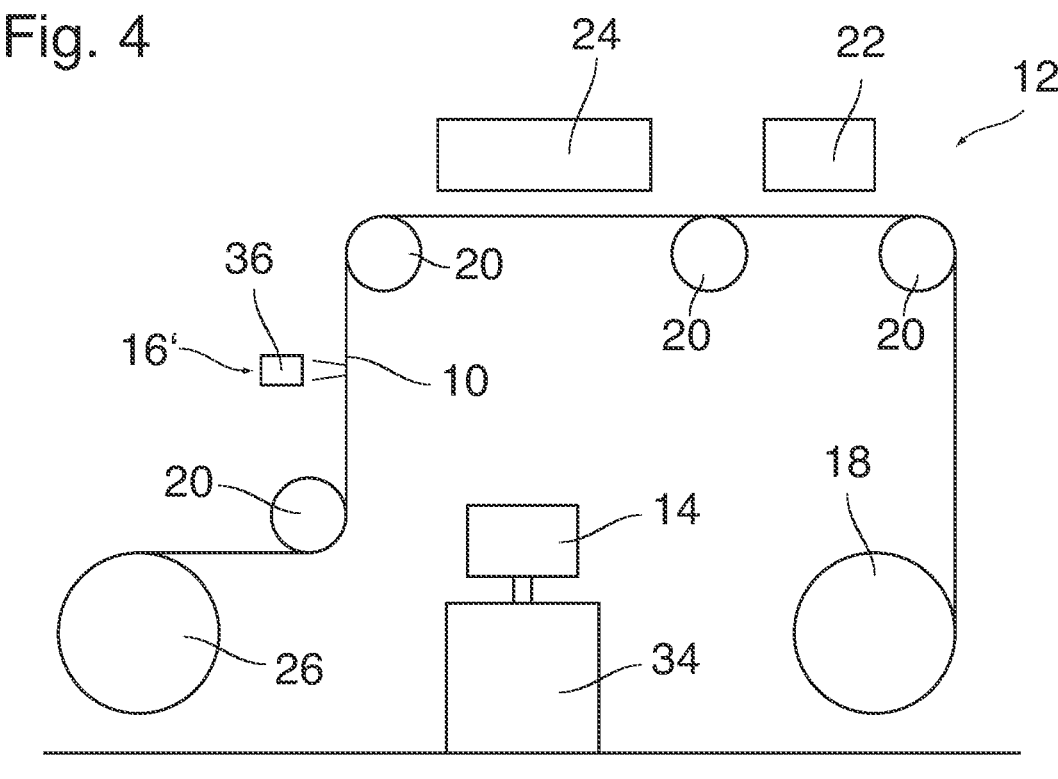
FIG. 4 shows a schematic diagram of a printing press with a web observation system according to another embodiment.
Figure 5:
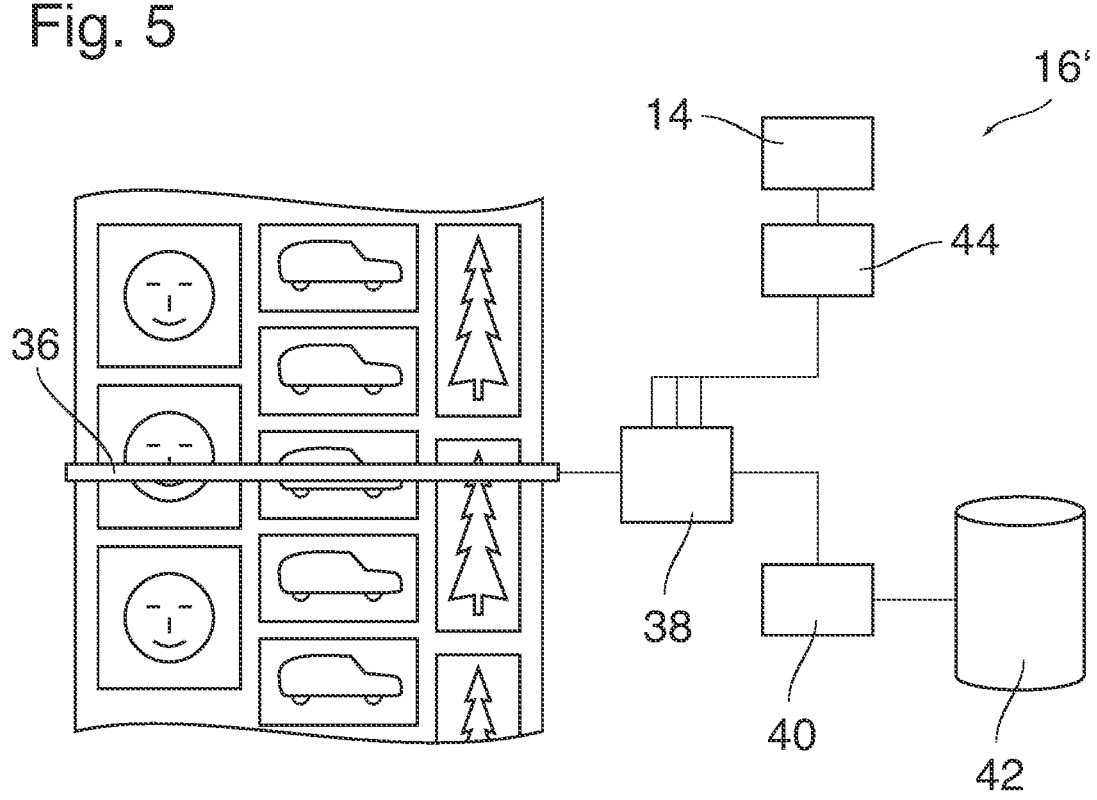
FIG. 5 is a schematic representation of the web observation system according to FIG. 4.

FIGS. 4 and 5 show, in representations analogous to FIGS. 2 and 3, a web observation system 16' according to another exemplary embodiment. In this case, a line camera 36 which extends over the entire width of the printing material web 10 is used for web observation and records a pixel line of the entire printing material web at any time. The line camera 36 thus delivers an image data stream that represents the entire length of the printed web and can also be used, for example, for web inspection in order to separate defective areas from the printed web after the print process has been completed. Sensors with a comparable function such as CIS sensors or matrix cameras with only a few lines to be read out are also considered "line cameras" in the sense of this description and the claims.

In FIG. 5, the image data supplied line by line by the line camera 36 are first buffered in a buffer 38. For example, the buffer 38 has a capacity that corresponds to the number of pixel rows of the motif c with the longest repeat. A compression module 40 reads the data from the buffer 38 and executes a compression algorithm that significantly reduces the amount of data. For example, the compression can be based on the fact that not the complete image information of each printed motif is saved, but only the change compared to the previous motif. The data compressed in this way are stored in a mass storage device 42 and are then available for web inspection.

The buffer 38 is divided into a number of memory blocks corresponding to the tracks A, B and C. In each of these blocks, the pixel rows can be addressed individually. A reading module 44 receives the synchronization signals from the printing unit 22 and uses them to calculate for each track the address of the pixel line at which the last recorded image of the motif begins. In this way, the image data are virtually synchronized track by track so that they can be reproduced on the display 14 as still images.

What is claimed is:

1. A method for digital printing on a running printing material web, comprising the steps of:

continually printing repeating motifs on the web by the step of displaying the motifs next to one another in a plurality of tracks and with a repeat that changes from track to track;

continually recording images of the printed motifs with a camera; and rendering the recorded images as still images on a display for web observation by the step of recording the images for web observation track by track and synchronously with the repeat applicable to the respective track.

2. The method according to claim 1, wherein the step of continually recording includes the step of recording the images for web observation with at least one matrix camera.

3. The method according to claim 2, wherein the step of continually recording includes the step of providing a separate said matrix camera for each track, each camera being synchronized with the repeat applicable to the respective track.

4. The method according to claim 2, further comprising the steps of:

transversely moving the at least one matrix camera across the width of the printing material web, and when the camera moves from one track to another track, switching the synchronization to the repeat for the another track.

5. The method according to claim 1, wherein the step of continually recording includes the step of recording the images for web observation with a line camera and further comprising the step of branching off the image data for the still images from an image data stream supplied by the line camera track by track and synchronously with the respective repeat.

6. The method according to claim 5, further comprising the steps of:

buffering the image data supplied by the line camera in a buffer, wherein the buffer is divided into individually addressable memory blocks, each of which corresponds to a track to the printing material web, reading the image data for the still images track by track from the buffer, and compressing the read image data.

7. A web observation system for a digital printing press for carrying out the method according to claim 1, comprising:

at least one camera for recording images of the motifs which were printed in the various tracks on the printing material web, and a synchronization device for track-by-track synchronization of at least one camera with the repeat of the printed motifs.

* * * * *